(12) United States Patent
Matsumoto

(10) Patent No.: US 10,647,006 B2
(45) Date of Patent: May 12, 2020

(54) HAND AND HAND SYSTEM

(71) Applicant: Fanuc Corporation, Yamanashi (JP)

(72) Inventor: Ryou Matsumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/390,775

(22) Filed: Apr. 22, 2019

(65) Prior Publication Data

US 2019/0358831 A1 Nov. 28, 2019

(30) Foreign Application Priority Data

May 22, 2018 (JP) .................................. 2018-098192

(51) Int. Cl.
*B25J 15/08* (2006.01)
(52) U.S. Cl.
CPC ..................................... *B25J 15/08* (2013.01)
(58) Field of Classification Search
CPC .... B25J 15/08; B25J 15/0253; B25J 15/0273; B25J 15/0266; B25J 15/0293; B25J 15/106
See application file for complete search history.

(56) References Cited

U.S. PATENT DOCUMENTS

| 4,621,852 | A  | * | 11/1986 | Maki ........................ B25J 15/10 294/67.22 |
| 6,994,510 | B2 | * | 2/2006 | Cooke .................... B62D 65/18 414/618 |
| 8,646,822 | B2 | * | 2/2014 | Braun ..................... H01R 43/20 269/32 |
| 8,690,213 | B2 | * | 4/2014 | Harada ................. B25J 15/0057 294/119.1 |
| 9,457,480 | B2 | * | 10/2016 | Usami ............... H01L 21/67259 |
| 9,737,994 | B2 | * | 8/2017 | Ishikawa .............. B25J 15/0047 |
| 10,040,203 | B2 | * | 8/2018 | Ochiishi ............. B25J 15/0253 |

FOREIGN PATENT DOCUMENTS

| JP | S61-144988 U | 9/1986 |
| JP | H04-046790 A | 2/1992 |
| JP | H04-69182 A | 3/1992 |
| JP | H06-015988 U | 3/1994 |
| JP | 2007-083331 A | 4/2007 |

* cited by examiner

*Primary Examiner* — Stephen A Vu
(74) *Attorney, Agent, or Firm* — Winstead PC

(57) ABSTRACT

A hand includes a pair of finger members disposed separated by an interval and relatively movable in an interval direction, a finger drive unit that moves at least one of the finger members in the interval direction, a pair of holding pads that are provided on the respective finger members, and are supported to face each other and to be rotatable around an axis extending in the interval direction, and a pressing member that is provided to be movable in a direction intersecting a radial direction, at a position separated from the axis in the radial direction, and presses a surface of a workpiece held between the holding pads.

4 Claims, 6 Drawing Sheets

the hand system 100 in which the hand 50 according to the present embodiment is mounted on a tip end of a robot 10. The hand system 100 according to the present embodiment includes the hand 50 that can hold a workpiece W as a working object, the robot 10 that includes the hand 50 at the tip end and changes a position and an attitude of the hand 50, and an imaging apparatus 80 that captures an image near the hand 50.

HAND AND HAND SYSTEM

CROSS-REFERENCE TO RELATED APPLICATIONS

This application is based on Japanese Patent Application No. 2018-098192, the content of which is incorporated herein by reference.

TECHNICAL FIELD

The present invention relates to a hand and a hand system.

BACKGROUND ART

A robot hand that includes paired main fingers and an auxiliary finger is well-known (for example, see PTL 1). The paired main fingers nip a workpiece as a working object from both sides to hold the workpiece, and the auxiliary finger comes into contact with the workpiece at a position different from positions of the main fingers. In the robot hand disclosed in PTL 1, the main fingers are rotated to be brought into close contact with a surface of the workpiece when the main fingers hold the workpiece.

CITATION LIST

Patent Literature

{PTL 1}
Japanese Unexamined Patent Application, Publication No. Hei 4-69182

SUMMARY OF INVENTION

One aspect of the present invention provides a hand including: a pair of finger members disposed separated by an interval and relatively movable in an interval direction; a finger drive unit that moves at least one of the finger members in the interval direction; a pair of holding pads that are provided on the respective finger members, the pair of holding pads being supported to face each other and to be rotatable around an axis extending in the interval direction; and a pressing member that is provided to be movable in a direction intersecting a radial direction, at a position separated from the axis in the radial direction, the pressing member pressing a surface of a workpiece held between the holding pads.

Another aspect of the present invention provides a hand system including the above-described hand and a control unit. The hand includes a sensor that detects a rotation amount of at least one of the holding pads around the axis, and a pressing drive unit that moves the pressing member, and the control unit controls the pressing drive unit on a basis of the rotation amount detected by the sensor.

DESCRIPTION OF EMBODIMENTS

A hand 50 and a hand system 100 according to an embodiment of the present invention are described below with reference to drawings.

Figure 1:
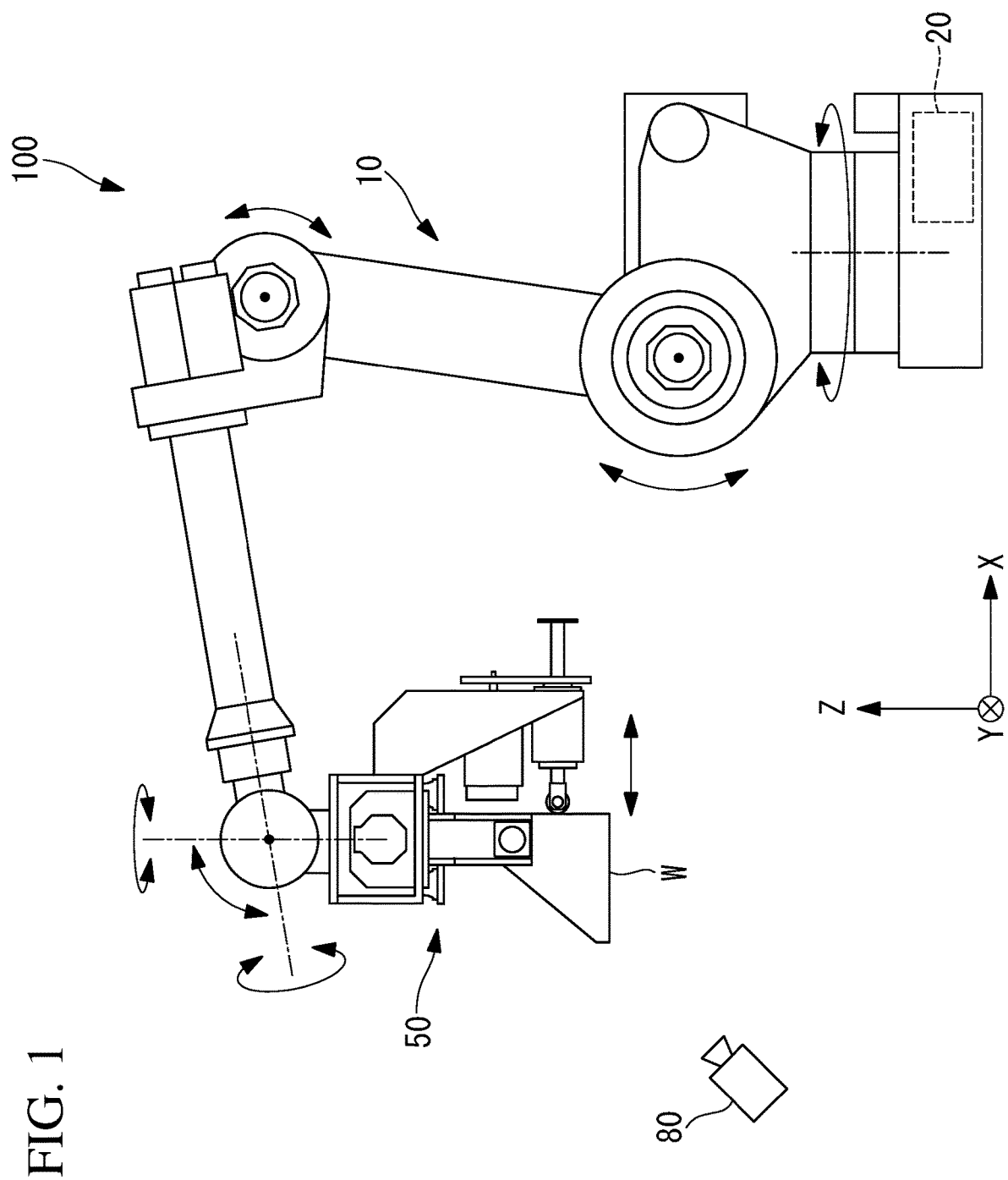
FIG. 1 is a schematic diagram of a hand system including a hand according to the present invention.

FIG. 1 is a schematic diagram of the hand system 100 in which the hand 50 according to the present embodiment is mounted on a tip end of a robot 10. The hand system 100 according to the present embodiment includes the hand 50 that can hold a workpiece W as a working object, the robot 10 that includes the hand 50 at the tip end and changes a position and an attitude of the hand 50, and an imaging apparatus 80 that captures an image near the hand 50.

The robot 10 is a vertical articulated robot including six joints. The robot 10 includes motors that rotate the respective joints around respective joint axes, and a control apparatus 20 that controls the motors.

Figure 2:
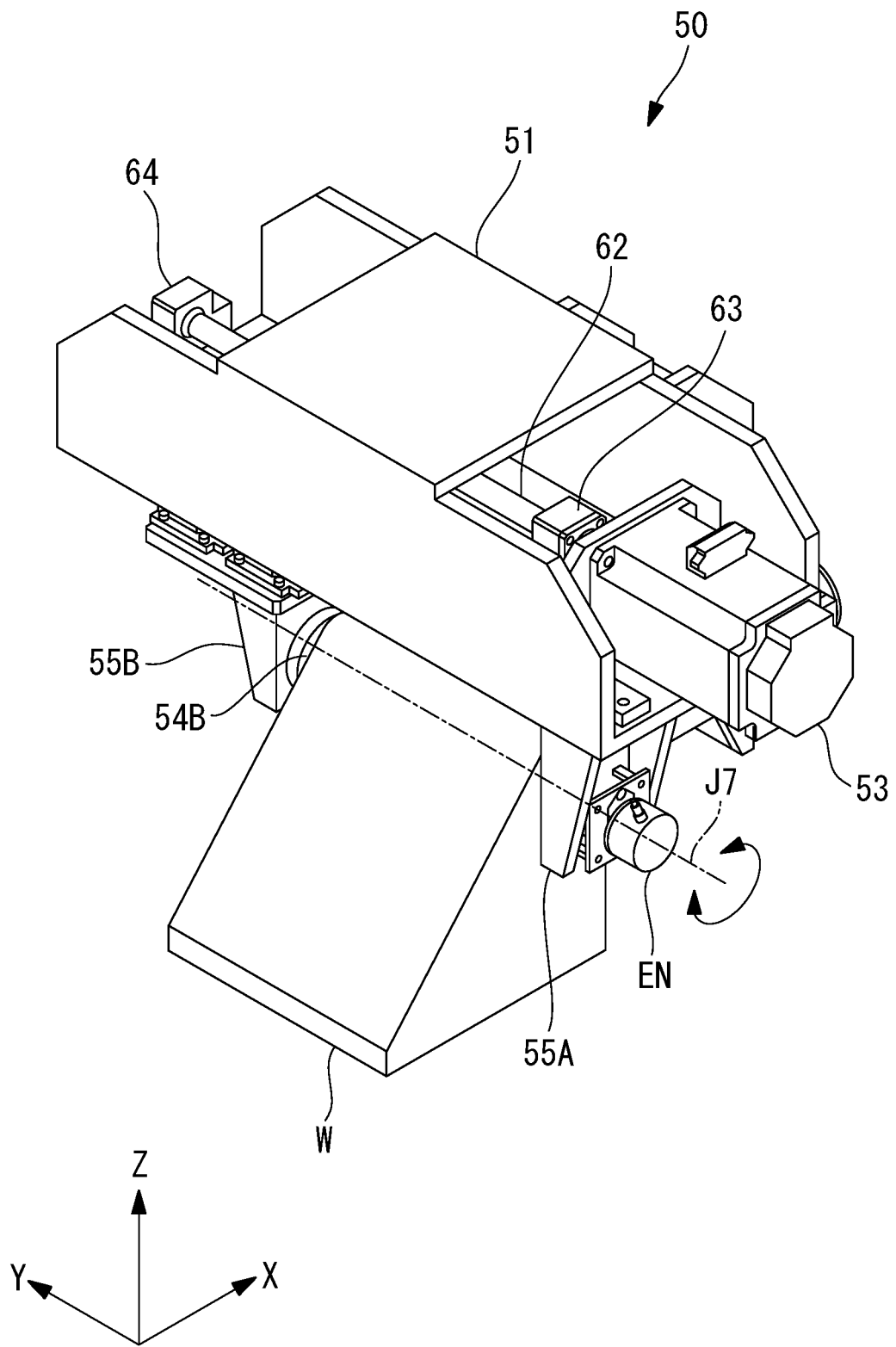
FIG. 2 is a perspective view of the hand illustrated in FIG. 1.

Note that a coordinate system of XYZ axes illustrated in FIG. 1 correspond to a coordinate system of XYZ axes illustrated in and after FIG. 2.

Figure 3:
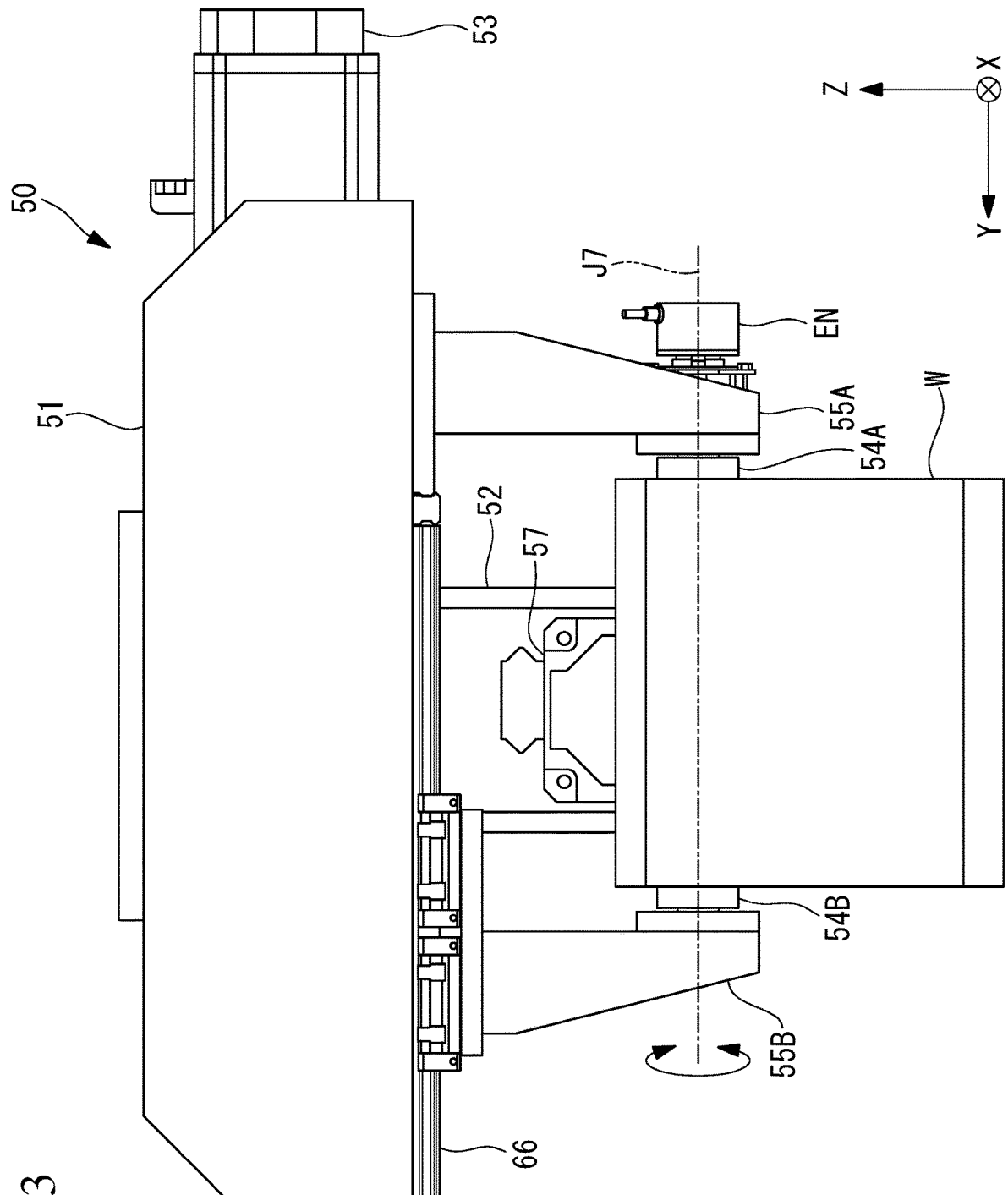
FIG. 3 is a side view of the hand illustrated in FIG. 1.
Figure 4:
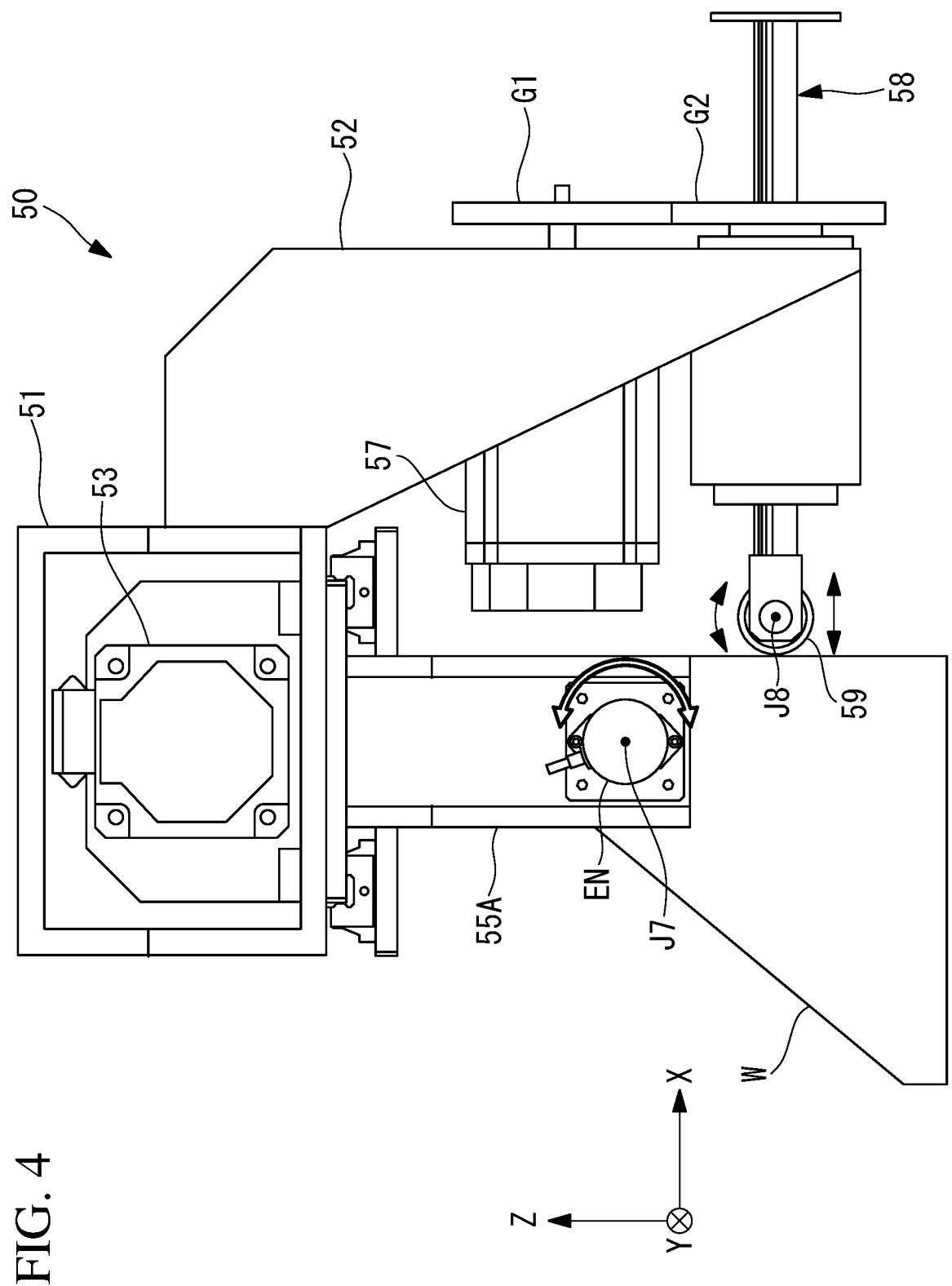
FIG. 4 is a side view of the hand illustrated in FIG. 1.

As illustrated in FIG. 2 to FIG. 4, the hand 50 includes a box base member 51, a ball screw (finger drive unit) 62 that is supported inside the base member 51 so as to be rotatable around a longitudinal axis, and a finger motor (finger drive unit) 53 that rotates and drives the ball screw 62. In the figures, reference numerals 63 and 64 denote bearing blocks that rotatably support the ball screw 62.

Further, the hand 50 includes a fixed finger (finger member) 55A fixed to the base member 51, and a movable finger (finger member) 55B that is supported so as to be movable in a direction along the longitudinal axis of the ball screw 62 by a linear guide 66 fixed to the base member 51. The movable finger 55B is fixed to an unillustrated nut of the ball screw 62.

The fixed finger 55A and the movable finger 55B respectively include fixed-side holding pad (holding pad) 54A and a movable-side holding pad (holding pad) 54B that are supported so as to be rotatable around a rotation axis (axis) J7 parallel to the longitudinal direction of the ball screw 62. The fixed-side holding pad 54A and the movable-side holding pad 54B are disposed so as to face each other between the fixed finger 55A and the movable finger 55B. The fixed-side holding pad 54A includes an encoder (sensor) EN that detects a rotation angle around the rotation axis J7 of the fixed-side holding pad 54 to the fixed finger 55A. Note that, in the following, the fixed finger 55A and the movable finger 55B are also collectively referred to as the "fingers 55A and 55B", and the fixed-side holding pad 54A and the movable-side holding pad 54B are also collectively referred to as the "holding pads 54A and 54B".

As illustrated in FIG. 4, the hand 50 includes a support member 52, a pressing motor (pressing drive unit) 57, and a ball screw spline 58. The support member 52 extends from the base member 51 in a direction in which the finger 55A and the finger 55B extend from the base member 51 (negative direction in Z axis in figure). The pressing motor 57 is fixed to the support member 52. The ball screw spline 58 linearly moves a shaft in a direction along the longitudinal axis with respect to the support member 52 by rotational driving force of the pressing motor 57.

As illustrated in FIG. 4, a motor-side gear G1 is fixed to a rotary shaft of the pressing motor 57. The ball screw spline 58 includes a shaft and a nut engaging with the shaft. The nut is supported by a support member so as to be rotatable around a longitudinal axis of the shaft. A spline-side gear G2 that engages with the motor-side gear G1 is attached to the nut with the longitudinal axis of the shaft as a center axis.

Accordingly, when the pressing motor 57 is driven, the rotational driving force of the pressing motor 57 is transmitted to the nut of the ball screw spline 58 by the motor-side gear G1 and the spline-side gear G2, and the shaft is moved in a direction along the longitudinal axis with respect to the nut. In the present embodiment, the longitudinal axis of the shaft of the ball screw spline 58 extends in parallel to a plane that is orthogonal to the rotation axis J7 of the holding pads 54A and 54B at an intermediate position between the two fingers 55A and 55B, and is provided on side opposite to the base member 51 with the rotation axis J7 in between.

As illustrated in FIG. 4, a cam follower 59 is supported so as to be rotatable around an axis J8 parallel to the rotation axis J7, at tip end of the shaft of the ball screw spline 58 on the fingers 55A and 55B side.

The imaging apparatus 80 illustrated in FIG. 1 acquires a captured image near the hand 50. In other words, the imaging apparatus 80 is an apparatus that captures an image of the workpiece W held by the hand 50. The captured image acquired by the imaging apparatus 80 is used for control performed by the control apparatus 20 described below.

Figure 5:
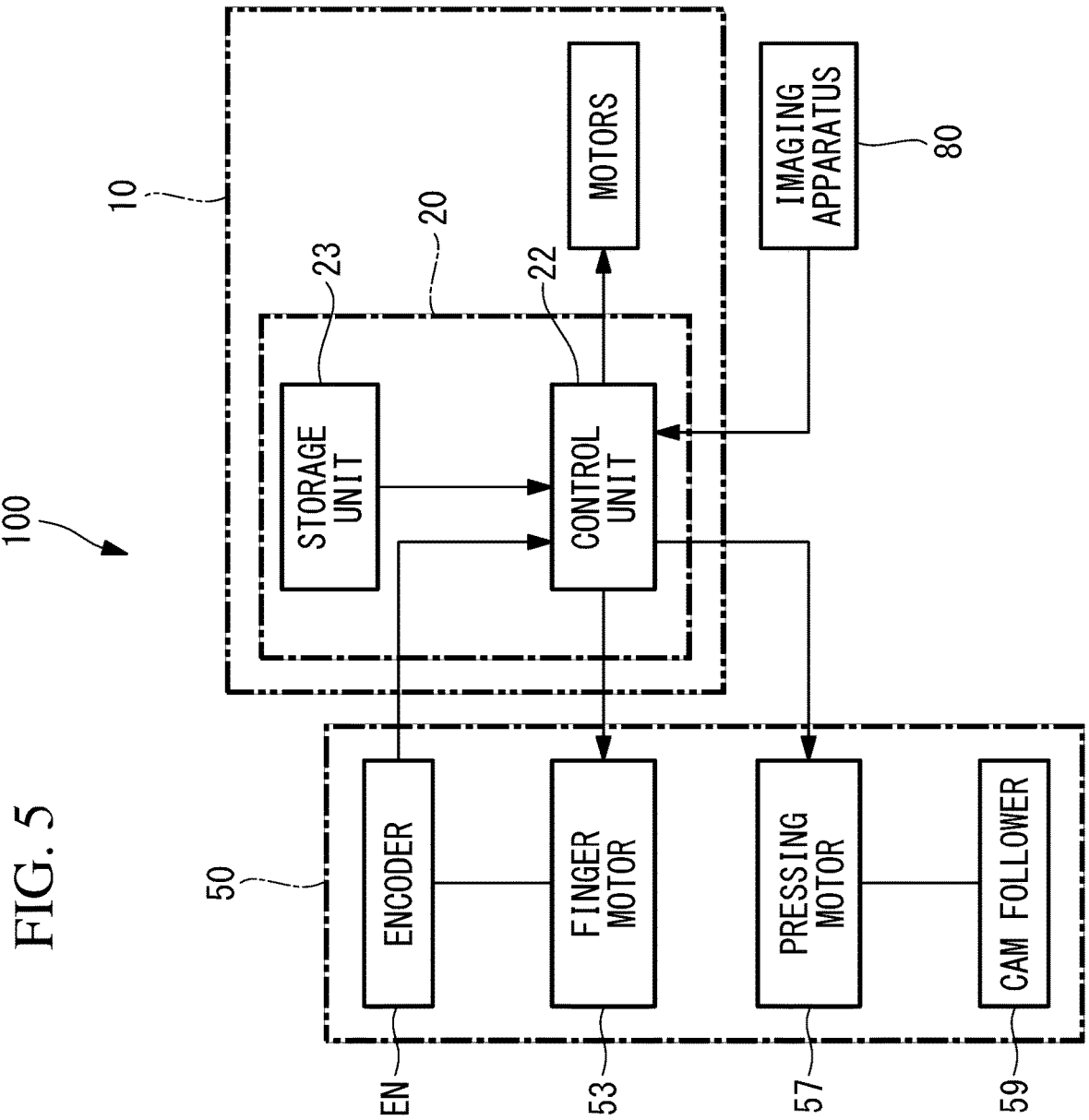
FIG. 5 is a block diagram of the hand system.

FIG. 5 is a block diagram of the hand system 100. The control apparatus 20 includes a CPU (Central Processing Unit), a ROM (Read Only Memory), and a RAM (Random Access Memory), that are not illustrated in FIG. 5. When the CPU develops a program stored in the ROM to the RAM, the control apparatus 20 can execute various kinds of control with execution of functions of the program.

The control apparatus 20 includes a control unit 22 that controls a rotation amount of the finger motor 53 and a rotation amount of the pressing motor 57, and a storage unit 23 that stores a three-dimensional model of the workpiece W, an operation program necessary to convey the workpiece W, etc.

The control unit 22 can detect the workpiece W in the captured image acquired by the imaging apparatus 80 with use of the three-dimensional model of the workpiece W stored in the storage unit 23. When detecting the workpiece W in the captured image, the control unit 22 determines held positions of the workpiece W held by the respective holding pads 54A and 54B, based on the three-dimensional model of the workpiece W stored in the storage unit 23 and the attitude of the workpiece W in the captured image acquired by the imaging apparatus 80.

The control unit 22 controls the motors corresponding to the respective joint axes of the robot 10 such that the holding pads 54A and 54B are located below the base member 51 and the held positions of the workpiece W are located on the rotation axis J7 between the holding pads 54A and 54B.

After the held positions of the workpiece W are located on the rotation axis J7, the control unit 22 drives the finger motor 53 to move the movable finger 55B toward the workpiece W, and controls the robot 10 to move the fixed finger 55A toward the workpiece W. Accordingly, each of the holding pads 54A and 54B come close to the corresponding held position of the workpiece W while a relative distance between the fixed-side holding pad 54A and the movable-side holding pad 54B is reduced. As a result, the holding pads 54A and 54B come into contact with the respective held positions of the workpiece W, and can hold the workpiece W with sufficient surface pressure applied to the holding pads 54A and 54B in the rotation axis J7 direction.

After the holding pads 54A and 54B hold the workpiece W, the control unit 22 drives the pressing motor 57 to move the cam follower 59 in a direction approaching the workpiece W along the longitudinal axis of the ball screw spline 58.

After the cam follower 59 approaching the work piece W comes into contact with the workpiece W, the control unit 22 controls the robot 10 to raise the hand 50 and to lift the workpiece W, and causes the robot 10 to convey the workpiece W in a predetermined attitude. When the attitude of the workpiece W held by the holding pads 54A and 54B is changed through rotation around the rotation axis J7, the control unit 22 controls a movement of the ball screw spline 58 based on the rotation amount detected by the encoder EN and the operation program for conveyance of the workpiece W.

Figure 6:
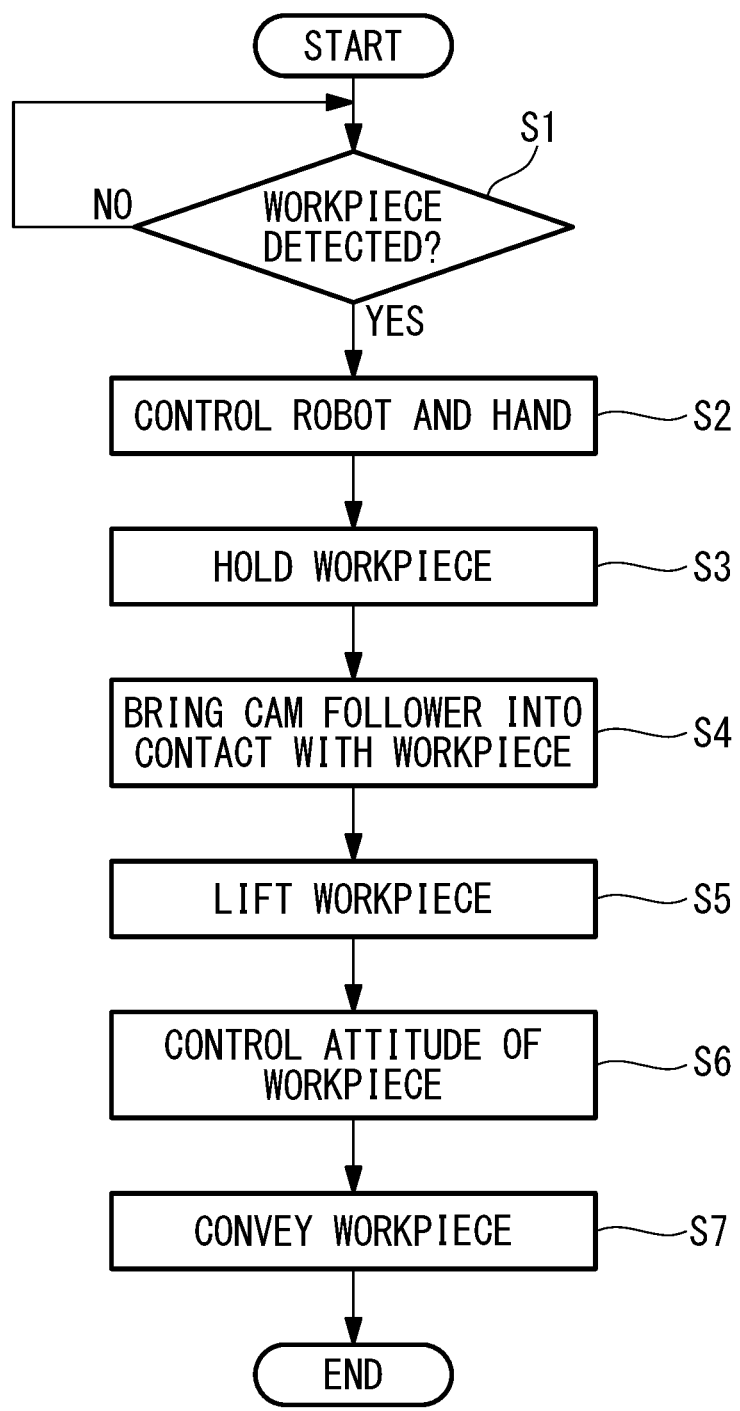
FIG. 6 is a flowchart of workpiece conveyance processing.

Action of the hand system 100 including the hand 50 according to the present embodiment is described along a flowchart of work conveyance processing illustrated in FIG. 6.

As illustrated in FIG. 6, the control unit 22 detects the workpiece W in the captured image acquired by the imaging apparatus 80 (step S1). When detecting the work piece W in the captured image (YES in step S1), the control unit 22 determines the held positions of the workpiece W, and controls the robot 10 and the hand 50 in order to cause the holding pads 54A and 54B to hold the workpiece W (step S2).

The control unit 22 moves the movable finger 55B to cause the holding pads 54A and 54B to hold the respective held positions of the workpiece W (step S3). Thereafter, the control unit 22 moves the ball screw spline 58 to bring the cam follower 59 into contact with the workpiece W (step S4). After the cam follower 59 is brought into contact with the workpiece W, the control unit 22 controls the robot 10 and the hand 50 to lift the held workpiece W (step S5).

After the lifted workpiece W is rotated around the rotation axis J7, the control unit 22 controls the pressing motor 57 based on the rotation amount detected by the encoder EN. As a result, the shaft of the ball screw spline 58 is moved in the longitudinal axis direction to press the cam follower 59 against the workpiece W, which controls the attitude of the workpiece W (step S6). In the workpiece conveyance processing according to the present embodiment, the cam follower 59 presses the workpiece W such that the variation of the rotation amount detected after the workpiece W is held becomes zero. As a result, the attitude of the workpiece W before and after the holding pads 54A and 54B hold the workpiece W is maintained.

The control unit 22 conveys the workpiece W to a predetermined position (step S7) while maintaining the attitude of the held workpiece W, and the work conveyance processing then ends.

According to the hand 50 of the present embodiment, when the relative distance between the fixed finger 55A and the movable finger 55B is reduced while the workpiece W is disposed between the fixed finger 55A and the movable finger 55B, the workpiece W is held by the holding pads 54A and 54B. In a case where a centroid of the held workpiece W is not located at a position vertically below the rotation axis J7, a moment acts on the workpiece W in a direction in which the centroid of the workpiece W is moved to the position vertically below the rotation axis J7. As a result, the holding pads 54A and 54B is rotated together with the workpiece W around the rotation axis J7 with respect to the fingers 55A and 55B. Therefore, it is unnecessary for the fingers 55A and 55B to receive the moment acting on the workpiece W, which makes it possible to downsize the fingers 55A and 55B while suppressing rigidity to receive the moment.

Further, according to the hand 50 of the present embodiment, the cam follower 59 coming into contact with the held workpiece W is rotatable around the axis J8 that is parallel to the rotation axis J7. Accordingly, even if the ball screw spline 58 is moved with respect to the support member 52 and the contact position of the cam follower 59 and the workpiece W is changed, friction force occurred at the contact position can be reduced through rotation of the cam follower 59 around the axis J8. Accordingly, the attitude of the held workpiece W is easily changed, and the driving force of the pressing motor 57 to change the attitude of the workpiece W can be reduced.

Further, in the hand system 100 according to the present embodiment, the control unit 22 controls the pressing motor 57 based on the rotation amount detected by the encoder EN. Therefore, the control unit 22 can convey the workpiece W while maintaining the predetermined attitude of the workpiece W based on the attitude of the workpiece W before the holding pads 54A and 54B hold the workpiece W.

Further, in the hand system 100 according to the present embodiment, the control unit 22 causes the holding pads 54A and 54B to hold the respective held position of the workpiece W that have been determined based on the shape of the workpiece W detected in the captured image acquired by the imaging apparatus 80. This determines the held positions at which the direction of the moment around the rotation axis J7 applied to the workpiece W by force in the direction in which the ball screw spline 58 approaches the held workpiece W and the direction of the moment occurred around the rotation axis J7 by the own weight of the workpiece W become reversed to each other. Accordingly, the cam follower 59 can generate the force in the direction to change the attitude of the workpiece W by the pressing force applied to the workpiece W.

Although the example of the hand 50 and the hand system 100 has been described in the above-described embodiment, the configuration of the hand 50 and the hand system 100 can be variously modified. The hand 50 according to the above-described embodiment includes only one ball screw spline 58 that presses the held workpiece W in the direction intersecting the rotation axis J7; however, the hand 50 may include two or more ball screw splines. For example, a longitudinal axis of a ball screw spline added in addition to the ball screw spline 58 according to the above-described embodiment may be disposed at a position on the base member 51 side of the rotation axis J7. In this case, the added ball screw spline moved along the longitudinal axis can apply, to the workpiece W, pressing force that generates a moment in a direction reverse to the direction of the moment around the rotation axis J7 applied to the workpiece W by the ball screw spline 58. As a result, the attitude of the held workpiece W is controlled irrespective of the held positions of the workpiece W held by the holding pads 54A and 54B.

In the above-described embodiment, the rotation amount is detected by the encoder EN. Alternatively, for example, a length measurement sensor provided on the support member 52 may detect a variation of a relative distance between the predetermined position of the held workpiece W and the length measurement sensor, to calculate the rotation amount of the workpiece W.

Although a servomotor is preferably used as the pressing motor 57 applying the rotational driving force to the ball screw spline 58, a normal motor may be also used. Further, as a driving source to move the fingers 55A and 55B and the cam follower 59 along the respective longitudinal axes, a hydraulic cylinder may be used. The cam follower 59 is not an essential component, and the tip end of the ball screw spline 58 not including a rotation structure may come into contact with the held workpiece W.

Although the relative distance between the fingers 55A and 55B according to the above-described embodiment is linearly varied by the ball screw 62, the fingers 55A and 55B can be variously modified within the scope of the well-known technology as long as the members are disposed separated by an interval so as to be relatively movable in the interval direction.

Although the ball screw spline 58 according to the above-described embodiment is a pressing member that is moved in parallel to the plane orthogonal to the rotation axis J7 and is linearly moved along the longitudinal axis direction, it is sufficient for the ball screw spline 58 to move in the direction intersecting the rotation axis J7. For example, the ball screw spline 58 may be a pressing member that is pivoted around the rotation axis J7 or around an axis parallel to the rotation axis J7, or a pressing member that is moved in an axis direction parallel to a plane not orthogonal to the rotation axis J7.

In the above-described embodiment, the held positions of the workpiece W are determined based on the workpiece W detected in the captured image acquired by the imaging apparatus 80 and the three-dimensional model of the workpiece W stored in the storage unit 23; however, specification of the shape of the workpiece W with use of the captured image and determination of the held positions can be variously modified. For example, the three-dimensional model of the workpiece W may not be stored in the storage unit 23, and the three-dimensional model and the held positions of the workpiece W may be specified based on the workpiece W detected in the captured image. Further, the hand system 100 may not include the imaging apparatus 80.

As a result, the above-described embodiment leads to the following aspects.

One aspect of the present invention provides a hand including: a pair of finger members disposed separated by an interval and relatively movable in an interval direction; a finger drive unit that moves at least one of the finger members in the interval direction; a pair of holding pads that are provided on the respective finger members, the pair of holding pads being supported to face each other and to be rotatable around an axis extending in the interval direction; and a pressing member that is provided to be movable in a direction intersecting a radial direction, at a position separated from the axis in the radial direction, the pressing member pressing a surface of a workpiece held between the holding pads.

According to the present aspect, when the workpiece is disposed between the pair of finger members disposed separated by the interval and the finger members are relatively moved so as to come close to each other by operation of the finger drive unit, the pair of holding pads provided on the respective finger members are pressed against the surface of the workpiece from both sides, to hold the workpiece between the finger members.

When a centroid of the workpiece is not located at a position vertically below the axis of the holding pads, a rotational moment acts on the workpiece in a direction in which the centroid is moved to the position vertically below the axis, and the holding pads are rotated around the axis. Accordingly, it is unnecessary for the finger members to receive the moment acting on the workpiece, which makes it possible to downsize the finger members while suppressing the rigidity to receive the moment. Further, the pressing member presses the surface of the workpiece at the position separated from the axis, thereby adjusting the attitude of the workpiece around the axis.

In the above-described aspect, the pressing member may include a rod movable in the direction intersecting the radial direction, and a cam follower that is supported to be rotatable around an axis parallel to the axis at a tip end of the rod and is pressed against the surface of the workpiece.

With this configuration, the cam follower inside the pressing member comes into contact with the workpiece held by the holding pads. When the workpiece is rotated around the axis, the position where the workpiece and the cam follower are in contact with each other is changed in some cases. The cam follower is rotatable around the axis parallel to the axis as a rotation center of the workpiece. Therefore, even if the position where the workpiece and the cam follower are in contact with each other is changed, friction force is reduced and the contact position is accordingly smoothly changed. As a result, the attitude of the workpiece held by the holding pads is easily changed, and the force to change the attitude of the workpiece can be reduced.

Another aspect of the present invention provides a hand system including the above-described hand and a control unit. The hand includes a sensor that detects a rotation amount of at least one of the holding pads around the axis, and a pressing drive unit that moves the pressing member, and the control unit controls the pressing drive unit on a basis of the rotation amount detected by the sensor.

According to the present aspect, the change of the attitude before and after holding of the workpiece held by the holding pads is specified based on the rotation amount detected by the sensor. The pressing drive unit moves the pressing member based on the specified rotation amount, which enables the hand to hold the workpiece and to maintain the predetermined attitude of the workpiece based on the attitude of the workpiece before holding.

In the above-described aspect, the control unit may control the pressing drive unit to cause variation of the rotation amount detected by the sensor after the hand holds the workpiece, to become zero.

With this configuration, the hand system can move the workpiece in the attitude same as the attitude before holding of the workpiece.

In the above-described aspect, the hand system may further include an imaging apparatus that acquires a captured image at a vicinity of the holding pads, and the control unit may detect a shape of the workpiece in the captured image, and may cause the holding pads to hold respective positions of the workpiece at which the moved pressing member can press the workpiece, on the basis of the detected shape of the workpiece.

With this configuration, the workpiece is held by the holding pads in a state where the pressing member can press the workpiece, through specification of the shape of the workpiece. As a result, the workpiece is surely pressed by the pressing member, and the attitude of the workpiece can be changed by the pressing member.

The hand according to the present invention achieves an effect to prevent upsizing with a simple configuration.

REFERENCE SIGNS LIST

22 Control unit
50 Hand
53 Finger motor (finger drive unit)
54A Fixed-side holding pad (holding pad)
54B Movable-side holding pad (holding pad)
55A Fixed finger (finger member)
55B Movable finger (finger member)
57 Pressing motor (pressing drive unit)
58 Ball screw spline (rod)
59 Cam follower
62 Ball screw (finger drive unit)
80 Imaging apparatus
100 Hand system
EN Encoder (sensor)
J7 Rotation axis (axis)
W Workpiece

The invention claimed is:

1. A hand comprising:
a pair of finger members disposed separated by an interval and relatively movable in an interval direction;
a finger drive unit that moves at least one of the finger members in the interval direction;
a pair of holding pads that are provided on the respective finger members, the pair of holding pads being supported to face each other and to be rotatable around an axis extending in the interval direction;
a pressing member that is provided to be movable in a direction intersecting a radial direction, at a position separated from the axis in the radial direction, the pressing member pressing a surface of a workpiece held between the holding pads; and
wherein the pressing member comprises a rod movable in the direction intersecting the radial direction, and a cam follower that is supported to be rotatable around an axis parallel to the axis at a tip end of the rod and is pressed against the surface of the workpiece.

2. A hand system, comprising:
the hand according to claim 1; and
a control unit, wherein
the hand includes a sensor that detects a rotation amount of at least one of the holding pads around the axis, and a pressing drive unit that moves the pressing member, and
the control unit controls the pressing drive unit on a basis of the rotation amount detected by the sensor.

3. The hand system according to claim 2, wherein the control unit controls the pressing drive unit to cause variation of the rotation amount detected by the sensor after the hand holds the workpiece, to become zero.

4. The hand system according to claim 2, further comprising an imaging apparatus that acquires a captured image at a vicinity of the holding pads, wherein
the control unit detects a shape of the workpiece in the captured image, and causes the holding pads to hold respective positions of the workpiece at which the moved pressing member can press the workpiece, on a basis of the detected shape of the workpiece.

* * * * *